(12) United States Patent
Lyons et al.

(10) Patent No.: US 11,863,959 B2
(45) Date of Patent: Jan. 2, 2024

(54) PERSONALIZED THREE-DIMENSIONAL AUDIO

(71) Applicant: HARMAN INTERNATIONAL INDUSTRIES, INCORPORATED, Stamford, CT (US)

(72) Inventors: Joy Lyons, Seattle, WA (US); Jason Riggs, Northridge, CA (US); Alfredo Fernandez Franco, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 180 days.

(21) Appl. No.: 17/602,269

(22) PCT Filed: Apr. 7, 2020

(86) PCT No.: PCT/US2020/027095
§ 371 (c)(1),
(2) Date: Oct. 7, 2021

(87) PCT Pub. No.: WO2020/210249
PCT Pub. Date: Oct. 15, 2020

(65) Prior Publication Data
US 2022/0167105 A1 May 26, 2022

Related U.S. Application Data

(60) Provisional application No. 62/831,081, filed on Apr. 8, 2019.

(51) Int. Cl.
*H04S 7/00* (2006.01)
*G10K 11/178* (2006.01)
(Continued)

(52) U.S. Cl.
CPC ........ *H04S 7/301* (2013.01); *G10K 11/17853* (2018.01); *H04S 3/004* (2013.01); *G06N 3/08* (2013.01); *H04S 2420/00* (2013.01)

(58) Field of Classification Search
None
See application file for complete search history.

(56) References Cited

U.S. PATENT DOCUMENTS

2007/0270988 A1* 11/2007 Goldstein ............... H04R 5/04
381/309
2015/0055783 A1 2/2015 Luo et al.
(Continued)

*Primary Examiner* — Kenny H Truong
(74) *Attorney, Agent, or Firm* — Artegis Law Group, LLP (57) ABSTRACT

A headphone system includes a calibration microphone for performing a calibration routine with a user. The calibration microphone receives a stimulus signal emitted by the headphone system and generates a response signal indicating variations in the stimulus signal that arise due to physiological attributes of the user. Based on the stimulus signal and the response signal, the calibration engine generates response data. The calibration engine processes the response data based on a headphone transfer function (HPTF) associated with the headphone system in order to create an inverse filter that can reduce or remove acoustic variations caused by the headphone system. The calibration engine generates a personalized HRTF for the user based on the response data and the inverse filter. The personalized HRTF can be used to implement highly accurate 3D audio and is thereby well-suited for applications to immersive audio and audio-visual entertainment.

20 Claims, 5 Drawing Sheets

(51) Int. Cl.
*H04S 3/00* (2006.01)
*G06N 3/08* (2023.01)

(56) References Cited

U.S. PATENT DOCUMENTS

| | | |
|---|---|---|
| 2015/0312694 A1 | 10/2015 | Bilinski et al. |
| 2015/0373477 A1 | 12/2015 | Norris et al. |
| 2015/0382127 A1 | 12/2015 | Sun et al. |
| 2016/0269849 A1 | 9/2016 | Riggs et al. |
| 2017/0245081 A1 | 8/2017 | Lyren et al. |
| 2017/0295445 A1 | 10/2017 | Christoph et al. |
| 2018/0139532 A1 | 5/2018 | Jain |

* cited by examiner

PERSONALIZED THREE-DIMENSIONAL AUDIO

CROSS-REFERENCE TO RELATED APPLICATIONS

This application is a U.S. National Stage patent application of International Patent Application No. PCT/US2020/027095, filed Apr. 7, 2020, the benefit of which is claimed, and claims the priority benefit of United States provisional patent application titled, "Personalized Three-Dimensional Audio," filed on Apr. 8, 2019 and having Ser. No. 62/831,081. The subject matter of these related applications are hereby incorporated herein by reference.

BACKGROUND

Field of the Disclosed Embodiments

The disclosed embodiments relate generally to computer software and audio engineering, and more specifically, to personalized three-dimensional audio.

Description of the Related Art

The human auditory system performs a biological process referred to as "sound localization" to identify from where sounds originate in three-dimensional (3D) space. In performing sound localization, the auditory system of a typical person analyzes different characteristics of a given sound, including pressure level, arrival time, and frequency, among others, and interprets variations in these characteristics as indicating a particular 3D location from which the sound originates. For example, suppose the pressure level of a particular sound is greater at the left ear of the person compared to the pressure level of that sound at the right ear of the person. The person's auditory system would interpret the variation in pressure level as indicating that the sound originates from a location on the left side of the person.

Oftentimes sound localization depends on physiology. For example, suppose the outer ears of a given person have a particular shape that attenuates certain frequencies in sounds that originate behind the person but does not attenuate those frequencies in sounds that originate in front of the person. When performing sound localization relative to a given sound, the person's auditory system would interpret the presence of those frequencies in the sound as indicating that the sound originates from a location in front of the person. Conversely, the person's auditory system would interpret the absence of those frequencies in the sound as indicating that the sound originates from a location behind the person. As a general matter, sound localization is a complex process that involves a variety of different mechanisms.

In the field of audio engineering, various signal processing algorithms have been developed that rely upon the different mechanisms of sound localization described above in order to synthesize sounds that seem to originate from arbitrary 3D locations. These types of signal processing algorithms usually implement a head-related transfer function (HRTF). An HRTF describes, for a given user, how the physical attributes of the user cause different characteristics of sounds to vary when those sounds originate from different locations. For example, a given HRTF could indicate that the outer ears of the user cause a predictable attenuation in one or more frequencies, as in the above example. HRTFs and corresponding signal processing algorithms can be used in the context of immersive audio-only entertainment and additionally in the context of audio-visual entertainment in order to cause users to perceive sounds generated by video elements as originating from spatial locations corresponding to those elements. Causing users to perceive sounds in the manner described is commonly referred to as "3D audio." Implementing 3D audio in video entertainment can increase immersion and user engagement, especially in the context of video games.

In order to implement accurate 3D audio for a given user, the HRTF of the user has to be determined. Various techniques for determining the HRTF for a given user are known in the art. One technique for determining the HRTF for a given user involves placing the user in an anechoic chamber and then performing various acoustic tests that involve measuring, at the user, variations in sounds that originate from different locations. However, this technique requires that the user visit a specialized facility and is therefore infeasible to perform on a wide scale for a large consumer base.

As the foregoing illustrates, what would be useful in the art is a technique for generating personalized HRTFs that is both accurate and capable of being deployed on a wide scale.

SUMMARY

Various embodiments include a computer-implemented method for generating a personalized head-related transfer function (HRTF) for a user, including generating response data based on a stimulus signal and a response signal, wherein a first audio driver within a headphone system transmits the stimulus signal towards a first ear of the user, and wherein the response signal is captured at the first ear of the user in response to the stimulus signal, generating a target HRTF based on the response data, wherein the target HRTF characterizes at least one physical attribute of the user, generating an inverse filter based on the response data and based on a headphone transfer function (HPTF) associated with the headphone system, and generating the personalized HRTF for the user based on the inverse filter and the target HRTF.

At least one technical advantage of the disclosed techniques relative to the prior art is that the disclosed techniques allow accurate HRTFs to be generated for users without requiring that users personally visit a specialized facility to participate in acoustic testing. Accordingly, the disclosed techniques can be deployed in consumer products intended for a wide audience.

BRIEF DESCRIPTION OF THE SEVERAL VIEWS OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

As noted above, various techniques exist for determining the HRTF of a given user in order to implement 3D audio for that user. One technique involves placing the user in an anechoic chamber and measuring variations in sounds that originate from different locations. However, this technique is generally infeasible to perform for a large consumer base because the user is required to visit a specialized facility and undergo various acoustic tests.

To address these issues, various embodiments include a calibration engine that performs a calibration routine with a headphone system worn by a user to generate a personalized HRTF for the user. The headphone system includes ear cups that fit over the ears of the user and a boom microphone that is configured to capture speech sounds produced by the user. Each ear cup includes an audio driver that emits sound to a respective ear of the user.

During the calibration routine, the boom microphone is removed from the headphone system and a calibration microphone is instead coupled to the headphone system via flexible cabling. The calibration microphone is placed into one ear of the user, and the calibration engine then causes the audio driver within the proximate ear cup to emit a stimulus signal. The stimulus signal could be a sine wave sweep, a broad spectrum noise pattern, a musical sequence, or any other sound pattern. The calibration microphone receives the stimulus signal and generates a response signal indicating variations in the stimulus signal that arise due to physiological attributes of the user. Based on the stimulus signal and the response signal, the calibration engine generates response data that includes, in some instances, a partial near-field HRTF that represents the response characteristics of the corresponding ear of the user and proximate portion of the headphone system. The above process may be repeated with the other ear of the user to generate response data that includes, in some instances, a partial near-field HRTF corresponding to the other ear of the user and proximate portion of the headphone system.

The calibration engine transforms the response data to correct for variations in placement of the calibration microphone during the calibration routine and to account for physiological attributes of the user, among other processing steps, thereby generating transformed response data. Based on the transformed response data, the calibration engine generates a target HRTF. The calibration engine also processes the response data based on a HPTF associated with the headphone system in order to create an inverse filter that can reduce or remove acoustic variations caused by the ear cups of the headphone system and/or other portions of the headphone system. The calibration engine then combines the inverse filter with the target HRTF to generate a personalized HRTF for the user. The personalized HRTF can be used to implement highly accurate 3D audio for immersive audio and audio-visual experiences.

At least one technical advantage of the disclosed techniques relative to the prior art is that the disclosed techniques allow accurate HRTFs to be generated for users without requiring that users personally visit a specialized facility to participate in acoustic testing. Accordingly, the disclosed techniques can be deployed in consumer products intended for a wide audience. Another technical advantage of the disclosed techniques is that the disclosed techniques enable highly accurate HRTFs to be generated that accurately reflect the physiological attributes of users, thereby increasing the quality of 3D audio implementations. These technical advantages represent one or more technological advancements over prior art approaches.

System Overview

Figure 1:
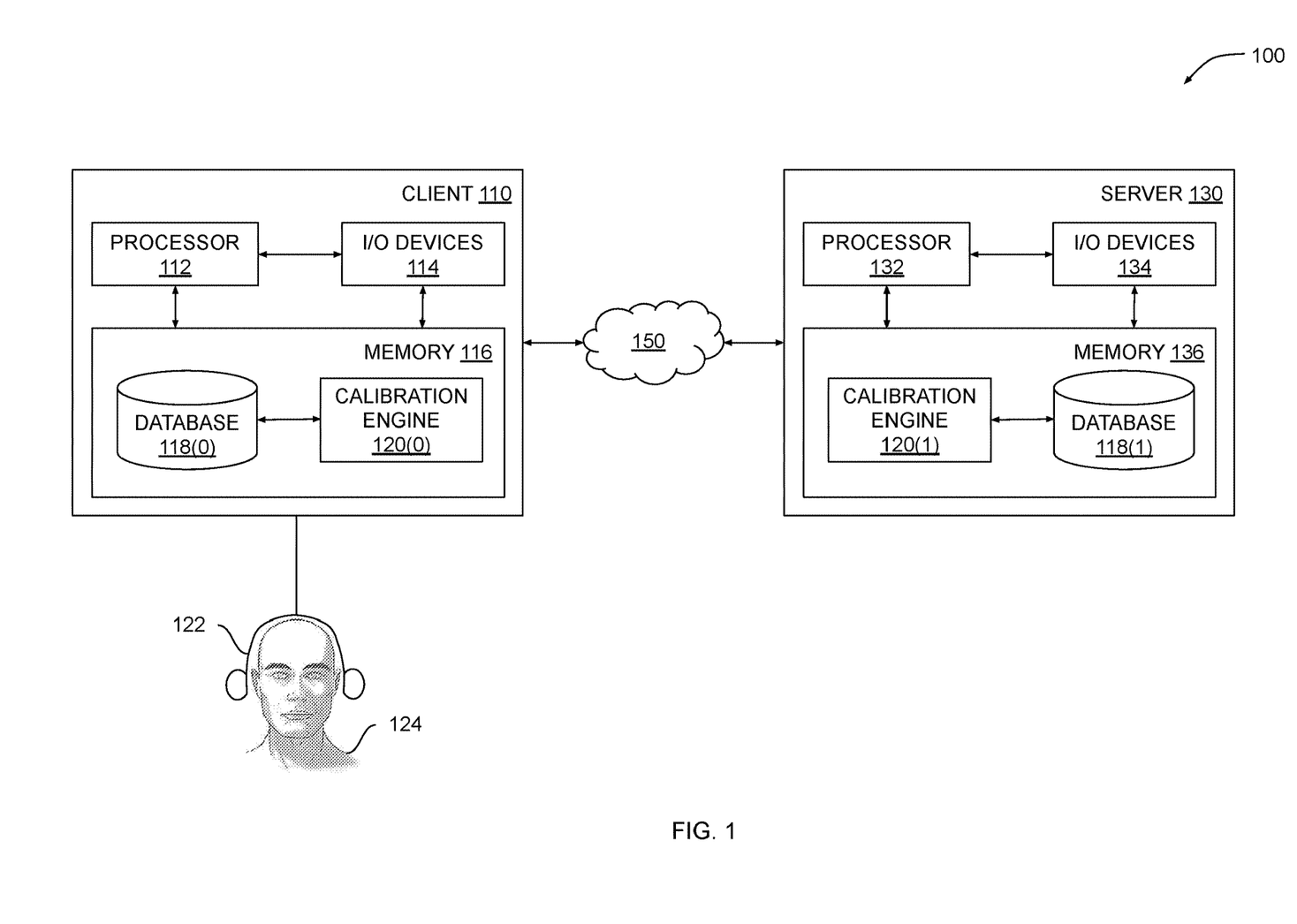
FIG. 1 illustrates a system configured to implement one or more aspects of the various embodiments.

FIG. 1 illustrates a system configured to implement one or more aspects of the various embodiments. As shown, a system 100 includes a client 110 and a server 130 coupled together via a network 150. Client 110 is coupled to a headphone system 122 that is configured to be worn by a user 124. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150. As a general matter, any of the processing operations disclosed herein may occur within any of the devices included in system 100 and/or distributed across any one or more of the devices included in system 100, e.g. using any technically feasible form of localized and/or cloud-based infrastructure.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs), one or more graphics processing units (GPUs), and/or one or more parallel processing units (PPUs). I/O devices 114 include any technically feasible set of devices configured to perform input and/or output operations, including, for example, a display device, a keyboard, and a touchscreen, among others. In one embodiment, I/O devices 114 may include sensors configured to characterize various physiological attributes of user 124.

Memory 116 includes any technically feasible storage media configured to store data and software applications, such as, for example, a hard disk, a random-access memory (RAM) module, and a read-only memory (ROM). Memory 116 includes a database 118(0) and a calibration engine 120(0). Database 118(0) is a file system and/or data storage application that stores various types of data. Calibration engine 120(0) is a software application that, when executed by processor 112, interoperates with a corresponding software application executing on server 130 to perform a calibration routine with headphone system 122.

Server 130 includes a processor 132, I/O devices 134, and a memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(1) and calibration engine 120(1). Database 118(1) is a file system and/or data storage application that stores various types of data, similar to database 118(0). In one embodiment, either or both of databases 118(0) and 118(1) may include one or more sets of parameters usable by a real-time synthesis algorithm for generating HRTFs based on one or more sets of parameters. Calibration engine 120(1) is a software application that, when executed by processor 132, interoperates with calibration engine 120(0) to perform the calibration routine mentioned above.

Figure 3:
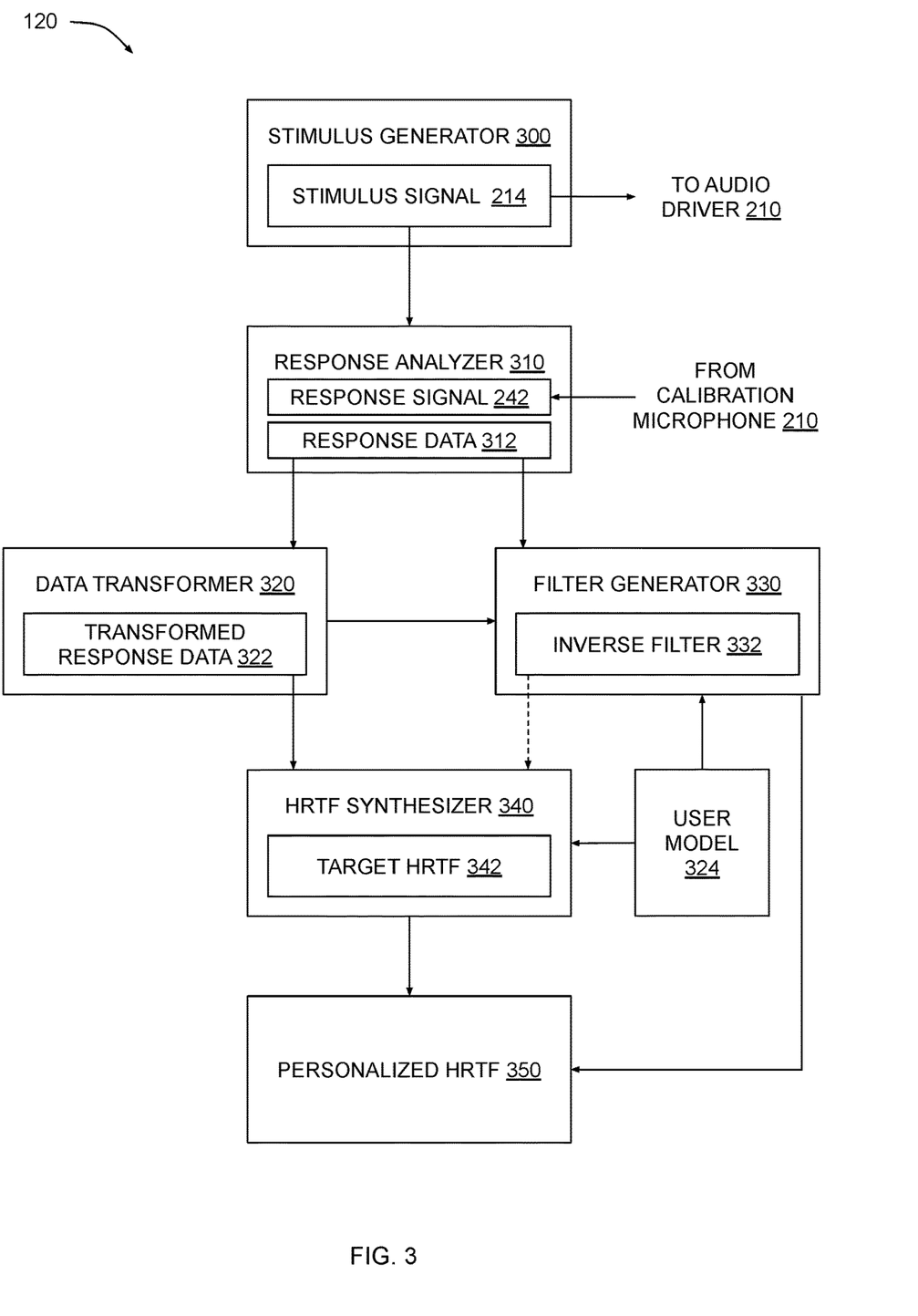
FIG. 3 is a more detailed illustration of the calibration engine of FIG. 1, according to various embodiments.

As a general matter, databases 118(0) and 118(1) represent separate portions of a distributed storage entity. Thus, for simplicity, databases 118(0) and 118(1) are collectively referred to herein as database 118. Similarly, calibration engines 120(0) and 120(1) represent separate portions of a distributed software entity that is configured to perform any and all of the inventive operations described herein. As such, calibration engines 120(0) and 120(1) are collectively referred to hereinafter as calibration engine 120, as also shown in FIG. 3.

In operation, calibration engine 120 performs the calibration routine with headphone system 122 and user 124 in order to generate a personalized HRTF for user 124. The personalized HRTF reflects specific physiological attributes of user 124 and/or how user 124 wears headphone system 122, and can therefore be used to implement highly accurate 3D audio. In the context of this disclosure, the term "3D audio" generally refers to any type of audio processing technique whereby a user is caused to perceive sound originating from a specific 3D location that is not necessarily the same as the 3D location where the sound actually originates. Headphone system 122 is described in greater detail below in conjunction with FIGS. 2A-2B, and calibration engine 120 is described in greater detail below in conjunction with FIGS. 3-4.

Figure 2A:
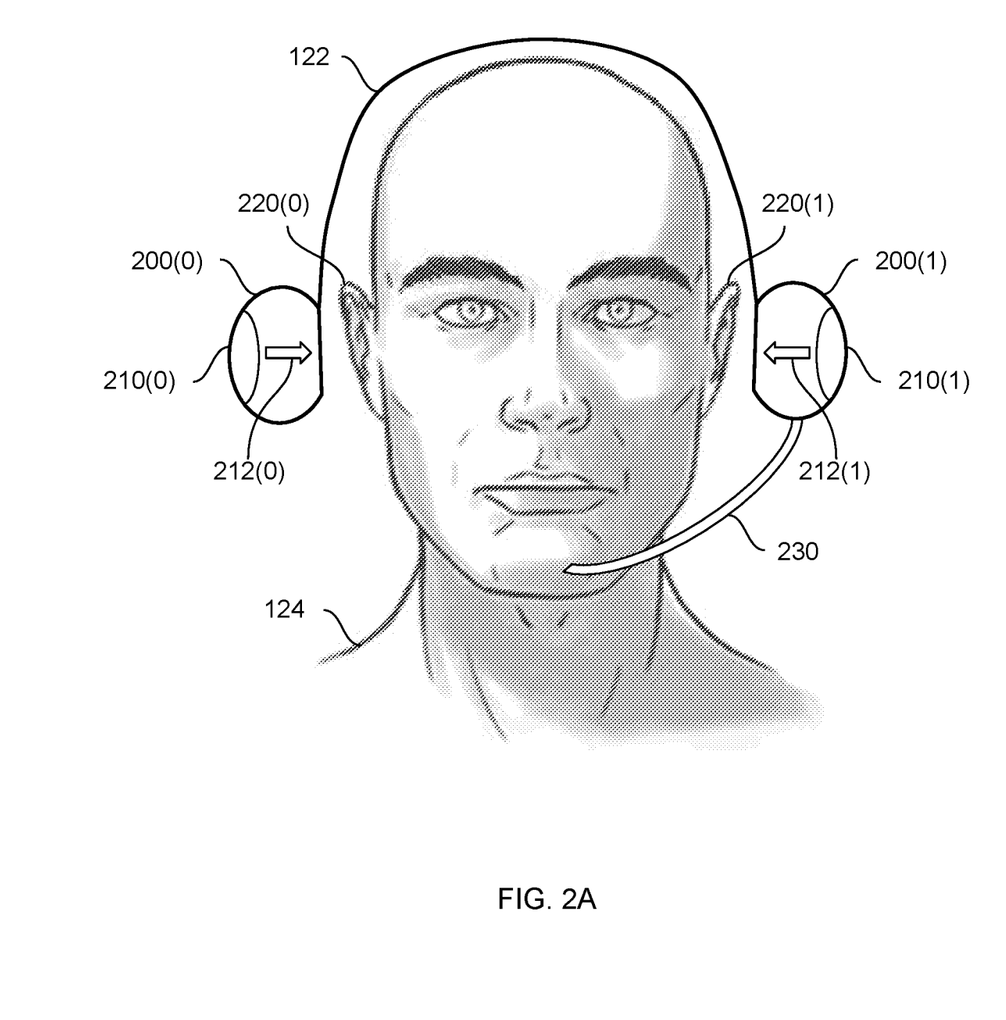
FIGS. 2A-2B illustrate different configurations of the system of FIG. 1, according to various embodiments.
Figure 2B:
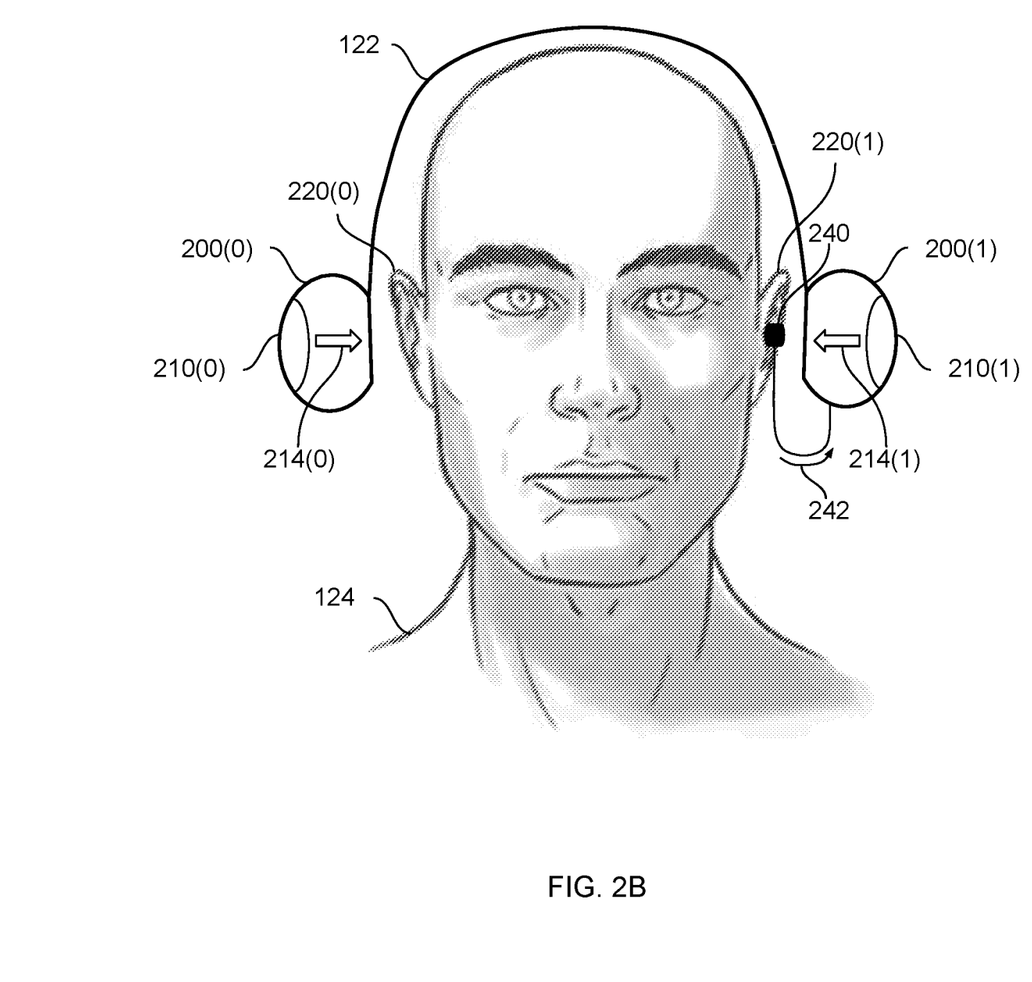

FIGS. 2A-2B illustrate different configurations of system 100, according to various embodiments. In particular, FIG. 2A illustrates a configuration of headphone system 122 that is associated with ordinary usage, while FIG. 2B illustrates a configuration of headphone system 122 that is associated with the calibration routine mentioned above.

As shown in FIG. 2A, headphone system 122 includes ear cups 200(0) and 200(1) that are configured to be worn over ears 220(0) and 220(1), respectively, of user 124. Each ear cup 200 includes an audio driver 210 that is configured to emit an acoustic signal 212 towards the proximate ear 220 of user 124. Headphone system 122 also includes a boom microphone 230 that is configured to record sounds produced by user 124, such as speech sounds, among others. In the configuration shown, headphone system 122 may be well suited for applications such as video games where 3D audio can be implemented. Prior to such usage, user 124 participates in the calibration routine mentioned above by configuring headphone system 122 in the manner shown in FIG. 2B.

As shown in FIG. 2B, boom microphone 230 is removed from headphone system 122 and, instead, a calibration microphone 240 is coupled to headphone system 122 via flexible cabling. In another embodiment, boom microphone 230 and calibration microphone 240 may be coupled to headphone system 122 at the same time. During the calibration routine, calibration microphone 240 is placed into one ear 220 of user 124. Calibration engine 120 then causes the proximate audio driver 210 to emit a stimulus signal 214. Calibration microphone 240 records a response signal 242 that is derived from the stimulus signal but is modulated by various factors, including the physical attributes of the ear 220 of user 124, the physical attributes of the proximate ear cup 200, how that ear cup 200 is worn, and so forth. Calibration engine 120 processes response signal 242 in conjunction with stimulus signal 214 to generate response data that, in some instances, includes a partial near-field HRTF associated with the corresponding ear 220 of user. Calibration engine 120 repeats the above process with calibration microphone 240 placed in the other ear 220 of user 124 to generate additional response data that, in some instances, includes a partial near-field HRTF associated with the other ear 220. In some embodiments, there are two calibration microphones that can measure both ears simultaneously or in succession, and in other embodiments, the calibration microphones are attached to the headphone directly, within the earcup, or close to the ears. Based on the response data generated in the manner described, calibration engine 120 performs various processing operations to generate a personalized HRTF for the user. Those processing operations are described in greater detail below in conjunction with FIG. 3.

Software Overview

FIG. 3 is a more detailed illustration of the calibration engine of FIG. 1, according to various embodiments. As shown, calibration engine 120 includes a stimulus generator 300, a response analyzer 310, a data transformer 320, a filter generator 330, and an HRTF synthesizer 340. The various modules shown interoperate with one another during the calibration routine to generate a personalized HRTF 350 for user 124.

In particular, during the calibration routine, stimulus generator 300 generates stimulus signal 214 that may span a broad spectrum of frequencies and amplitudes. Stimulus signal 214 could be, for example, a sine sweep, a noise pattern, a musical sequence, or any other technically feasible signal pattern designed to test a set of frequencies. Stimulus generator 300 transmits stimulus signal 214 to audio driver 210 for transmission to the proximate ear 220 of user 124, where calibration microphone 240 is situated. Calibration microphone 240 receives a version of stimulus signal 214 that is modulated by the proximate ear cup 200 and proximate ear 220 and generates response signal 242 based on that modulated version of stimulus signal 214. The above process is repeated for the other ear of user 124.

Response analyzer 310 processes stimulus signal 214 in conjunction with the response signals 242 generated for ear(s) 220 of user 124 to generate response data 312. In one embodiment, response data 312 may include partial near-field HRTFs associated with each ear 220 of user 124. As a general matter, response data 312 characterizes, for each ear 220 of user 124, the acoustic modulation properties of that ear, the proximate ear cup 200, and/or headphone system 122 as a whole.

Data transformer 320 processes response data 312 in order to correct the positioning of calibration microphone 240 within an inner portion of each ear 220 of user 124. In particular, data transformer 320 modifies response data 312 based on expected response data that is gathered using a test subject or a humanoid testing dummy. The expected response data may be collected at a reference position associated with the test subject or the humanoid testing dummy, and data transformer 320 modifies response data 312 to correct for any differences between a source position where calibration microphone 240 resides and the reference position.

In one embodiment, in a laboratory setting, reference HRTF datasets may be collected by one or more reference microphones that have been positioned at one or more preferred locations by trained personnel. In a consumer version of headphone system 122, calibration microphone 240 may be different from the one or more reference microphones and the form factor of the calibration microphone 240 assembly may be different from that of the reference microphone assembly, such as to be more robust and to be easier for the end-user to self-position, such as on a manufactured ear tip. The consumer product version of headphone system 122 may also be measured in the laboratory setting for the same test subjects or humanoid testing dummies. Data transformer 320 may implement a simple transfer function from calibration microphone 240 and the position of calibration microphone 240, to the one or more reference microphones and the positions of the one or more reference microphones. In some examples, data transformer 320 may also implement a more complex algorithm that can create a set of transfer functions or a unique transfer function for a given calibration measurement based on computations such as regression, machine learning, and/or the like.

User model 324 processes data about the user in order to account for additional physiological attributes, including attributes of the head and/or body of user 124 that may affect the arrival time of sounds received at the different ears 220 of user 124. In one embodiment, calibration engine 120 may generate user model 324 based on sensor data that is captured relative to user 124. For example, calibration engine 120 could estimate the head circumference of user 124, distances between ears 220 of user 124 based, the distance between the ears and the shoulders of user 124, and/or general HRTF related physiology of user 124 based on images and/or video captured relative to user 124. In another embodiment, calibration engine 120 may generate user model 324 based on measurements of user 124 that are provided by user 124, e.g., via a graphical user interface (GUI). For example, calibration engine 120 could obtain from user 124 a measurement of the head circumference of user 124 via the GUI. In either of the above examples, calibration engine 120 could determine a difference in arrival times between ears 220 of user 124 based on the head circumference of user 124 and/or the distance between ears 220 of user 124. This data may also be used by filter generator 330 as additional information to create the inverse filter 332 and/or by the HRTF synthesizer 340 to better synthesize the target HRTF 342. The calibration microphone 240 is used in the determination of the partial near-field HRTF that includes the HPTF and the HRTF. The transfer function of the headphone can be influenced by the fit of the headphone which can be related to the size of the head. The response data 312 combined with the user model 324 may be used to disambiguate between the HPTF and the HRTF to increase the accuracy of the inverse filter 332 and/or increase the accuracy of the target HRTF 342.

In conjunction with the above operations of data transformer 320, filter generator 330 processes response data 312 using a HPTF. A nominal HPTF is predetermined based on laboratory and/or manufacturing testing of headphone system 122. In doing so, filter generator 330 generates an inverse filter 332 that can be used to reduce or remove acoustic variations caused by ear cups 200 and/or other portions of headphone system 122. Inverse filter 332 can also be used to reduce the effects of leakage caused by variations in the fit of the headphone from how user 124 wears headphone system 122, which may also be informed by user model 324 as defined above. In one embodiment, filter generator 330 may quantify and/or correct for such leakage based on a comparison between response signal 242 and one or more predetermined response signals measured using a test subject or a humanoid testing dummy. The process to correct for calibration microphone 240 placement and/or headphone fit by response analyzer 310 is similar to creating an inverse filter 332 for the headphone in the filter generator 330. Where one process to create the inverse filter may be based on the nominal headphone response measured in the laboratory, and/or another process to create the inverse filter may be based on a distribution of expected headphone responses across manufactured headphone devices, and/or the distribution of interactions of the headphones for different user 124 with possessing different physiology.

HRTF synthesizer 340 obtains transformed response data 322 from data transformer 320, inverse filter 332 from filter generator 330, and user model 324. Based on transformed response data 322, HRTF synthesizer 340 generates a target HRTF 342. In one embodiment, HRTF synthesizer 340 may select a default HRTF associated with headphone system 122 based on one or more characteristics of transformed response data 322. In another embodiment, HRTF synthesizer 340 transmits transformed response data 322 to a cloud-based artificial intelligence engine (e.g., as part of calibration engine 120(1)) that is configured to synthesize target HRTF 342 based on transformed response data 322. The cloud-based artificial intelligence engine may be trained using training data that maps response data captured for a variety of users to HRTFs generated for those users. The artificial intelligence engine could be, for example, a neural network, a machine learning model, or a rules engine, among others. This artificial intelligence engine may run in the device, in the local host, such as a computer, or in the cloud. The target HRTF 342 may be stored in static form in a database or may be computed dynamically, in real-time.

Target HRTF 342 can be used to modify the perceived point of origination of sounds emitted by headphone system 122, but may include acoustic artifacts caused by headphone system 122. These acoustic artifacts can be reduced or removed using inverse filter 332. Accordingly, HRTF synthesizer 340 applies inverse filter 332 to target HRTF 342 to generate personalized HRTF 350. Personalized HRTF 350 can be used to implement highly accurate 3D audio and is thereby well-suited for immersive audio and for immersive audio-video entertainment, especially video games. In addition, personalized HRTF 350 can be reused in other audio output systems, such as in-vehicle infotainment systems, in order to implement highly accurate 3D audio for user 124. The above techniques are described in greater detail below in conjunction with FIG. 4.

Procedure for Generating a Personalized HRTF

Figure 4:
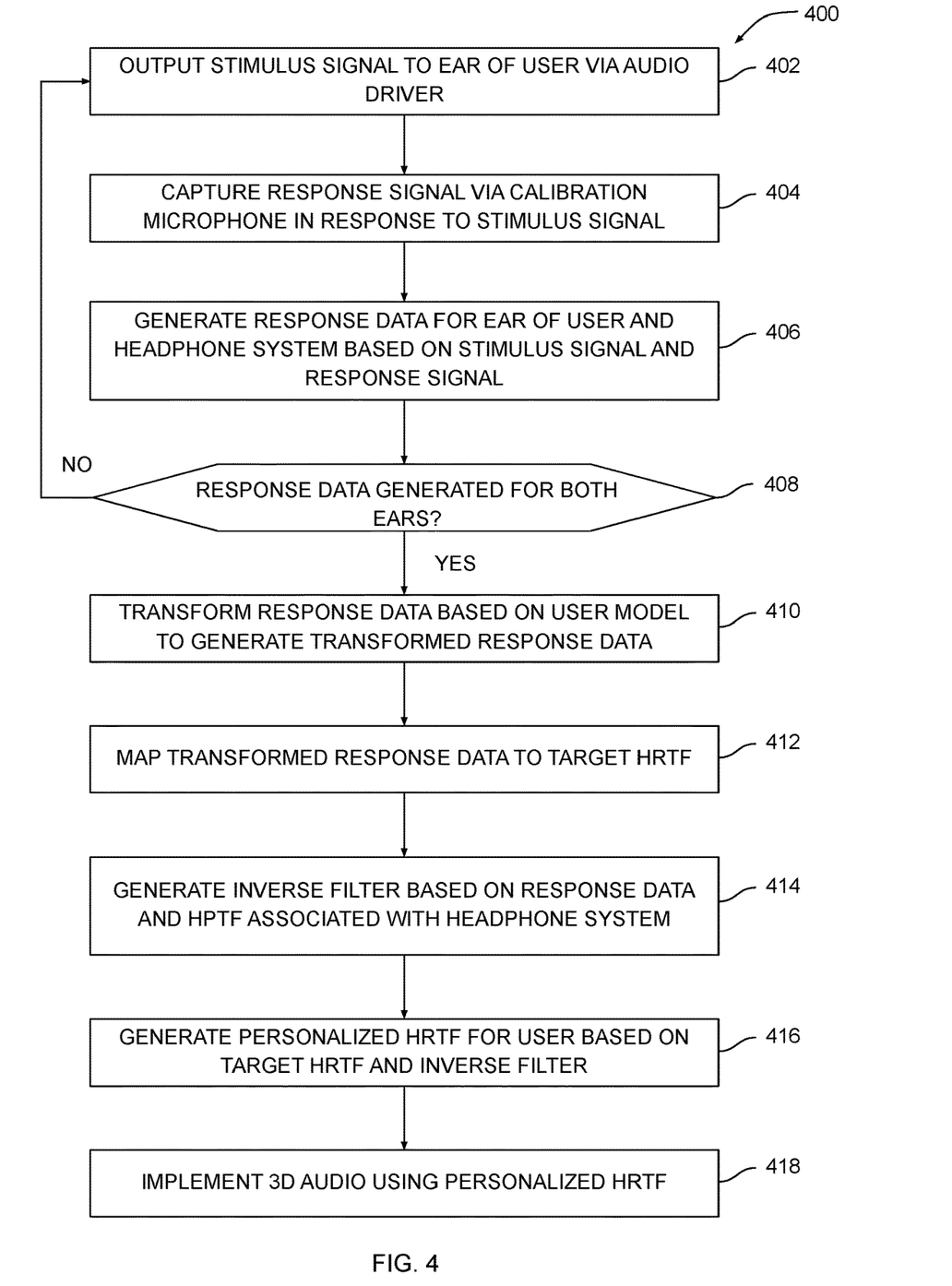
FIG. 4 is a flow diagram of method steps for generating a personalized HRTF for use in three-dimensional audio, according to various embodiments.

FIG. 4 is a flow diagram of method steps for generating a personalized HRTF for use in three-dimensional audio, according to various embodiments. Although the method steps are described in conjunction with the systems of FIGS. 1-3, persons skilled in the art will understand that any system configured to perform the method steps in any order falls within the scope of the present embodiments.

As shown, a method 400 begins at step 402, where stimulus generator 300 within calibration engine 120 causes one of audio drivers 210 to output stimulus signal 214 to one of the ears 220 of user 124. Stimulus signal 214 may be a sine wave sweep across a range of frequencies and/or amplitudes, a broad spectrum noise pattern, a musical sequence, or any other technically feasible acoustic pattern.

At step 404, response analyzer 310 within calibration engine 120 captures response signal 242 via calibration microphone 240 in response to stimulus signal 214. Calibration microphone 240 can be coupled to headphone system 122 in place of boom microphone 230 shown in FIG. 2A via flexible cabling, and then inserted into the ear 220 of user 124 when the calibration routine is performed.

At step 406, response analyzer 310 generates response data 312 for the ear 220 of user 124 and headphone system 122 based on stimulus signal 214 and response signal 242 In some instances, response analyzer 310 generates a partial near-field HRTF for the ear 220 of user 124 and proximate portion of headphone system 122. The partial near-field HRTF may include one or more curves that relate an input frequency response associated with stimulus signal 214 to an output frequency response associated with response signal 242.

At step 408, calibration engine 120 determines whether response data 312 has been generated for both ears 220 of user 124. If calibration engine 120 determines that response data 312 has not yet been generated for both ears, then the method 400 returns to step 402 and steps 402, 404, and 406 repeat with calibration microphone 240 placed in the other ear 220 of user 124. If calibration engine 120 determines that response data 312 has been generated for both ears 220 of user 124, then the method 400 proceeds to step 410. In another embodiment, the calibration engine uses the response data 312 from a single ear to perform the disclosed calibration techniques.

At step 410, data transformer 320 within calibration engine 120 generates transformed response data 322 based on response data 312. Data transformer 320 processes response data 312 in order to correct the positioning of calibration microphone 240 within the ear 220 of user 124. Data transformer 320 also processes response data 312 based on user model 324 in order to account for additional physiological attributes of user 124, including attributes of the head and/or body of user 124 that may affect the arrival time of sounds received at the different ears 220 of user 124.

At step 412, HRTF synthesizer 340 within calibration engine 120 maps transformed response data 322 to a target HRTF 342. In one embodiment, HRTF synthesizer 340 may select a default HRTF associated with headphone system 122 based on one or more characteristics of transformed response data 322. In another embodiment, HRTF synthesizer 340 transmits transformed response data 322 to a cloud-based artificial intelligence engine that is configured to synthesize target HRTF 342 based on transformed response data 322

At step 414, filter generator 330 within calibration engine 120 generates inverse filter 332 based on response data 312 and an HPTF associated with headphone system 122. The HPTF can be predetermined based on laboratory testing of headphone system 122. Inverse filter 332 that can be used to reduce or remove acoustic variations caused by ear cups 200 and/or other portions of headphone system 122. Inverse filter 332 can also be used to reduce the effects of leakage caused by variations in how user 124 wears headphone system 122.

At step 416, HRTF synthesizer 340 generates personalized HRTF 350 for user 124 based on target HRTF 342 and inverse filter 332. Personalized HRTF 350 reflects one or more physical attributes of user 124 and also accounts for various acoustic properties of headphone system 122. Accordingly, personalized HRTF 350 can be used to implement highly accurate 3D audio. At step 418, personalized HRTF 350 is used to implement 3D audio for user 124. For example, a video game engine could use personalized HRTF 350 to cause user 124 to perceive sounds that are localized to positions corresponding to various virtual elements.

In sum, a headphone system includes a calibration microphone for performing a calibration routine with a user. The calibration microphone receives a stimulus signal emitted by the headphone system and generates a response signal indicating variations in the stimulus signal that arise due to physiological attributes of the user. Based on the stimulus signal and the response signal, the calibration engine generates response data. The calibration engine processes the response data based on a HPTF associated with the headphone system in order to create an inverse filter that can reduce or remove acoustic variations caused by the headphone system. The calibration engine generates a personalized HRTF for the user based on the response data and the inverse filter. The personalized HRTF can be used to implement highly accurate 3D audio and is thereby well-suited for immersive audio and immersive audio-visual entertainment.

At least one technical advantage of the disclosed techniques relative to the prior art is that the disclosed techniques allow accurate HRTFs to be generated for users without requiring that users personally visit a specialized facility to participate in acoustic testing. Accordingly, the disclosed techniques can be deployed in consumer products intended for a wide audience. Another technical advantage of the disclosed techniques is that the disclosed techniques enable highly accurate HRTFs to be generated that accurately reflect the physiological attributes of users, thereby increasing the quality of 3D audio implementations. These technical advantages represent one or more technological advancements over prior art approaches.

1. Some embodiments include a computer-implemented method for generating a personalized head-related transfer function (HRTF) for a user, the method comprising generating response data based on a stimulus signal and a response signal, wherein a first audio driver within a headphone system transmits the stimulus signal towards a first ear of the user, and wherein the response signal is captured at the first ear of the user in response to the stimulus signal, generating a target HRTF based on the response data, wherein the target HRTF characterizes at least one physical attribute of the user, generating an inverse filter based on the response data and based on a headphone transfer function (HPTF) associated with the headphone system, and generating the personalized HRTF for the user based on the inverse filter and the target HRTF.

2. The computer-implemented method of clause 1, wherein the response data includes a partial near-field HRTF associated with the first ear of the user.

3. The computer-implemented method of any of clauses 1-2, wherein the stimulus signal comprises a sine wave sweep across a range of frequencies and a range of amplitudes.

4. The computer-implemented method of any of clauses 1-3, wherein generating the target HRTF comprises transforming the response data based on a location where the response signal is captured to generate transformed response data, and selecting the target HRTF from a set of default HRTFs based on the transformed response data.

5. The computer-implemented method of any of clauses 1-4, wherein generating the target HRTF comprises transforming the response data based on the at least one physical attribute of the user to generate transformed response data, and causing a machine learning model to synthesize the target HRTF based on the transformed response data, wherein the machine learning model is trained based on response data associated with a plurality of users and HRTFs generated for the plurality of users.

6. The computer-implemented method of any of clauses 1-5, wherein the inverse filter is configured to reduce acoustic artifacts caused by the headphone system.

7. The computer-implemented method of any of clauses 1-6, wherein the response signal is captured by a calibration microphone that is disposed within an inner portion of the first ear of the user.

8. The computer-implemented method of any of clauses 1-7, wherein the calibration microphone is coupled to the headphone system in place of a boom microphone that is configured to capture sounds produced by the user.

9. The computer-implemented method of any of clauses 1-8, further comprising modifying a perceived point of origination of a sound emitted by the first audio driver based on the personalized HRTF.

10. The computer-implemented method of any of clauses 1-9, wherein the at least one physical attribute of the user is captured via one or more sensors.

11. Some embodiments include a non-transitory computer-readable medium storing program instructions that, when executed by a processor, cause the processor to generate a personalized head-related transfer function (HRTF) for a user by performing the steps of generating response data based on a stimulus signal and a response signal, wherein a first audio driver within a headphone system transmits the stimulus signal towards a first ear of the user, and wherein the response signal is captured at the first ear of the user in response to the stimulus signal, generating a target HRTF based on the response data, wherein the target HRTF characterizes at least one physical attribute of the user, generating an inverse filter based on the response data and based on a headphone transfer function (HPTF) associated with the headphone system, and generating the personalized HRTF for the user based on the inverse filter and the target HRTF.

12. The non-transitory computer-readable medium of clause 11, wherein the response data includes a partial near-field HRTF associated with the first ear of the user.

13. The non-transitory computer-readable medium of any of clauses 11-12, wherein the stimulus signal comprises a sine wave sweep across a range of frequencies and a range of amplitudes.

14. The non-transitory computer-readable medium of any of clauses 11-13, wherein the step of generating the target HRTF comprises transforming the response data based on a location where the response signal is captured to generate transformed response data, and selecting the target HRTF from a set of default HRTFs based on the transformed response data.

15. The non-transitory computer-readable medium of any of clauses 11-14, wherein the step of generating the target HRTF comprises transforming the response data based on the at least one physical attribute of the user to generate transformed response data, and causing a neural network to synthesize the target HRTF based on the transformed response data, wherein the neural network is trained based on response data associated with a plurality of users and HRTFs generated for the plurality of users.

16. The non-transitory computer-readable medium of any of clauses 11-15, wherein the inverse filter is configured to reduce acoustic artifacts caused by at least one of position variations and leakage associated with a first ear cup that includes the first audio driver and is worn over the first ear of the user.

17. The non-transitory computer-readable medium of any of clauses 11-16, wherein the response signal is captured by a calibration microphone that is disposed within an inner portion of the first ear of the user, and wherein the calibration microphone is coupled to the headphone system in place of a boom microphone that is configured to capture sounds produced by the user.

18. The non-transitory computer-readable medium of any of clauses 11-17, further comprising the step of modifying a perceived point of origination of a sound emitted by the first audio driver based on the personalized HRTF.

19. The non-transitory computer-readable medium of any of clauses 11-18, wherein the at least one physical attribute of the user is determined based on a user interaction with a graphical user interface.

20. Some embodiments include a system, comprising a memory that stores a calibration engine, and a processor that executes the calibration engine to perform the steps of transmitting, using a first audio driver within a headphone system, a stimulus signal towards a first ear of a user, capturing a response signal at the first ear of the user in response to the stimulus signal, generating response data based on the stimulus signal and the response signal, generating a target HRTF based on the response data, wherein the target HRTF characterizes at least one physical attribute of the user, generating an inverse filter based on the response data and based on a headphone transfer function (HPTF) associated with the headphone system, and generating a personalized HRTF for the user based on the inverse filter and the target HRTF.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a personalized head-related transfer function (HRTF) for a user, the method comprising:
   generating response data based on a stimulus signal and a response signal, wherein a first audio driver within a headphone system transmits the stimulus signal towards a first ear of the user, and wherein the response signal is captured at the first ear of the user in response to the stimulus signal;
   generating a target HRTF based on the response data, wherein the target HRTF characterizes at least one physical attribute of the user;
   generating an inverse filter based on the response data and based on a headphone transfer function (HPTF) associated with the headphone system; and
   generating the personalized HRTF for the user based on the inverse filter and the target HRTF.

2. The computer-implemented method of claim 1, wherein the response data includes a partial near-field HRTF associated with the first ear of the user.

3. The computer-implemented method of claim 1, wherein the stimulus signal comprises a sine wave sweep across a range of frequencies and a range of amplitudes.

4. The computer-implemented method of claim 1, wherein generating the target HRTF comprises:
   transforming the response data based on a location where the response signal is captured to generate transformed response data; and
   selecting the target HRTF from a set of default HRTFs based on the transformed response data.

5. The computer-implemented method of claim 1, wherein generating the target HRTF comprises:
   transforming the response data based on the at least one physical attribute of the user to generate transformed response data; and
   causing a machine learning model to synthesize the target HRTF based on the transformed response data, wherein the machine learning model is trained based on response data associated with a plurality of users and HRTFs generated for the plurality of users.

6. The computer-implemented method of claim 1, wherein the inverse filter is configured to reduce acoustic artifacts caused by the headphone system.

7. The computer-implemented method of claim 1, wherein the response signal is captured by a calibration microphone that is disposed within an inner portion of the first ear of the user.

8. The computer-implemented method of claim 7, wherein the calibration microphone is coupled to the headphone system in place of a boom microphone that is configured to capture sounds produced by the user.

9. The computer-implemented method of claim 1, further comprising modifying a perceived point of origination of a sound emitted by the first audio driver based on the personalized HRTF.

10. The computer-implemented method of claim 1, wherein the at least one physical attribute of the user is captured via one or more sensors.

11. A non-transitory computer-readable medium storing program instructions that, when executed by a processor, cause the processor to generate a personalized head-related transfer function (HRTF) for a user by performing the steps of:
   generating response data based on a stimulus signal and a response signal, wherein a first audio driver within a headphone system transmits the stimulus signal towards a first ear of the user, and wherein the response signal is captured at the first ear of the user in response to the stimulus signal;
   generating a target HRTF based on the response data, wherein the target HRTF characterizes at least one physical attribute of the user;

generating an inverse filter based on the response data and based on a headphone transfer function (HPTF) associated with the headphone system; and generating the personalized HRTF for the user based on the inverse filter and the target HRTF.

12. The non-transitory computer-readable medium of claim 11, wherein the response data includes a partial near-field HRTF associated with the first ear of the user.

13. The non-transitory computer-readable medium of claim 11, wherein the stimulus signal comprises a sine wave sweep across a range of frequencies and a range of amplitudes.

14. The non-transitory computer-readable medium of claim 11, wherein the step of generating the target HRTF comprises:

transforming the response data based on a location where the response signal is captured to generate transformed response data; and selecting the target HRTF from a set of default HRTFs based on the transformed response data.

15. The non-transitory computer-readable medium of claim 11, wherein the step of generating the target HRTF comprises:

transforming the response data based on the at least one physical attribute of the user to generate transformed response data; and causing a neural network to synthesize the target HRTF based on the transformed response data, wherein the neural network is trained based on response data associated with a plurality of users and HRTFs generated for the plurality of users.

16. The non-transitory computer-readable medium of claim 11, wherein the inverse filter is configured to reduce acoustic artifacts caused by at least one of position variations and leakage associated with a first ear cup that includes the first audio driver and is worn over the first ear of the user.

17. The non-transitory computer-readable medium of claim 11, wherein the response signal is captured by a calibration microphone that is disposed within an inner portion of the first ear of the user, and wherein the calibration microphone is coupled to the headphone system in place of a boom microphone that is configured to capture sounds produced by the user.

18. The non-transitory computer-readable medium of claim 11, further comprising the step of modifying a perceived point of origination of a sound emitted by the first audio driver based on the personalized HRTF.

19. The non-transitory computer-readable medium of claim 11, wherein the at least one physical attribute of the user is determined based on a user interaction with a graphical user interface.

20. A system, comprising:

a memory that stores a calibration engine; and a processor that executes the calibration engine to perform the steps of:

transmitting, using a first audio driver within a headphone system, a stimulus signal towards a first ear of a user;

capturing a response signal at the first ear of the user in response to the stimulus signal;

generating response data based on the stimulus signal and the response signal;

generating a target HRTF based on the response data, wherein the target HRTF characterizes at least one physical attribute of the user;

generating an inverse filter based on the response data and based on a headphone transfer function (HPTF) associated with the headphone system; and generating a personalized HRTF for the user based on the inverse filter and the target HRTF.

* * * * *